United States Patent [19]

Burke et al.

[11] Patent Number: 4,803,334

[45] Date of Patent: Feb. 7, 1989

[54] METHOD FOR LASER BEAM WELDING METAL MATRIX COMPOSITE COMPONENTS

[75] Inventors: Michael A. Burke, Pittsburgh; Gerald G. Lessmann, Pleasant Hills, both of Pa.

[73] Assignee: Westinghouse Electric Corp., Pittsburgh, Pa.

[21] Appl. No.: 121,814

[22] Filed: Nov. 16, 1987

[51] Int. Cl.$^4$ .............................................. B23K 26/00
[52] U.S. Cl. ........................... 219/121.64; 219/121.63
[58] Field of Search ................. 219/121 LC, 121 LD, 219/121 LW, 121 EC, 121 ED, 121 L, 121 LM, 121 LA, 121 LB, 121.62, 121.61, 121.63, 121.64, 121.6, 121.85, 121.13, 121.14

[56] References Cited

U.S. PATENT DOCUMENTS

| | | | |
|---|---|---|---|
| 3,474,219 | 10/1969 | Steigerwald et al. | 219/121.85 |
| 3,949,186 | 4/1976 | Nakayama et al. | 219/121 LC X |
| 3,952,180 | 4/1976 | Gnanamuthu | 219/121.85 |
| 4,015,100 | 3/1977 | Gnanamuthu et al. | 219/121.85 |
| 4,157,923 | 6/1979 | Yen et al. | 219/121.85 X |
| 4,164,641 | 8/1979 | Scheffels et al. | 219/121.35 |
| 4,167,662 | 9/1979 | Steen | 219/121.6 |
| 4,203,021 | 5/1980 | Anderl et al. | 219/121.12 |
| 4,219,720 | 8/1980 | Moench | 219/121.35 |
| 4,243,867 | 1/1981 | Earle et al. | 219/121.63 |
| 4,251,709 | 2/1981 | Schumacher | 219/121.64 |
| 4,272,665 | 6/1981 | Steigerwald | 219/121 LW X |
| 4,323,756 | 4/1982 | Brown et al. | 219/121.66 |
| 4,374,315 | 2/1983 | Timbrook | 219/121 LC X |
| 4,447,703 | 5/1984 | Stol | 219/136 |
| 4,471,204 | 9/1984 | Takafuji et al. | 219/121.64 |
| 4,507,540 | 3/1985 | Hamasaki | 219/121.64 |
| 4,514,613 | 4/1985 | Hill et al. | 219/121 LD X |
| 4,546,230 | 10/1985 | Sasaki et al. | 219/121.64 |
| 4,560,855 | 12/1985 | Takafuji et al. | 219/121.64 |
| 4,634,832 | 1/1987 | Martyr | 219/121 LD X |
| 4,649,256 | 3/1987 | Minamida et al. | 219/121 LD |

Primary Examiner—C. L. Albritton

[57] ABSTRACT

A substantially homogeneous metal matrix composite conduction weld between first and second metal matrix composite components is formed by placing the components into abutting position, with a major portion thereof spaced from each other, and directing a laser beam through the spacing onto the intersection and oscillating the beam across the intersection to form a shallow pool of metal matrix composite while feeding a metal matrix composite filler wire into the pool. The laser beam and filler wire are moved along the intersection such that solidification of the molten pool containing the filler wire metal matrix composite is effected, to form the weld line, without separation of the metal matrix composite into separate phases. The filler wire may be preheated and pressure may be applied, either to one or both components in a direction transverse the plane of the intersection or to the weld line in the direction of the plane of the intersection.

17 Claims, 2 Drawing Sheets

METHOD FOR LASER BEAM WELDING METAL MATRIX COMPOSITE COMPONENTS

CROSS-REFERENCE TO RELATED APPLICATION

Reference is made to a related copending U.S. patent application Ser. No. 010,762 filed Feb. 4, 1987 by Gerald J. Bruck, et al. entitled "Method of Welding" now U.S. Pat. No. 4,737,612, issued Apr. 12, 1988, assigned to the assignee of the present invention.

BACKGROUND OF THE INVENTION

The present invention relates to a method for laser beam welding components that are composed of a metal matrix composite material to form a full bond strength and a uniformly dispersoid structure in the weld bead. Metal matrix composites, despite their high strength and modulus to weight properties, are restricted in application because of the inability to maintain their structure during welding. A similar problem occurs with particulate containing materials, e.g., Oxide Dispersion Strengthened [ODS] alloys. In both cases the lighter particles tend to float out of the melt during the liquid phase of a conventional welding process. The weld zone is, therefore, depleted in the strengthening agent which consequently leads to inferior properties in the weld zone. Examination of metal matrix composite [MMC] joint properties often shows that these strengths are only compared to that of the matrix alloy since the joint properties are so poor in comparison to those of the composite.

Examination of a conventional arc welding process demonstrates why segregation of the species occurs. In gas metal arc welding (GMAW) the heat of the arc melts both the base plate material and the consumable wire electrode (filler wire). In a typical case the liquid phase weld pool, that is formed by the base plate and the material that has been transferred across the arc from the filler wire, will be approximately one half an inch in diameter and one eighth to one quarter inch deep. Within this superheated pool, flotation of the lighter, inert species will occur. Subsequent solidification of the molten bead can only entrap the particles or fibers at the position to which they have floated, i.e., on the surface. Furthermore, in GMAW the filler material is actually transferred to the pool in liquid (droplet) form. In this case it may be anticipated that the use of metal matrix composite materials as filler wire will not only result in phase separation but also probably in seriously unstable welding arc conditions, in addition to the loss of properties caused by the separation of the phases.

Filler metal additions may also be made to gastungsten arc welding (GTAW) processes by introducing a filler wire into the weld pool. When the wire is heated by the passage of an electric current, this is known as "hot wire gas-tungsten arc welding" (HWGTAW). Conventional hot wire GTAW suffers from the need to keep the filler wire in contact with the electrically grounded workpiece and is, therefore, somewhat difficult to control. Specifically, problems arise when the heat from the arc source is sufficiently intense to melt the wire before it reaches the weld pool: in this case the electrical continuity required to heat the wire is lost and the control circuit becomes unstable. Also, while such a process, involving hot or cold wire, appears to be a reasonable approach to introducing the composite material into the weld zone in a solid, and thus, with a relatively uniform distribution of particles or fibers, the weld pools that are developed in GTAW are still of a large size. The size of the pool, and the high temperatures that are developed across the pool, allow mechanical separation of the strengthening and matrix phases by flotation before solidification.

In arc welding processes the energy density that is provided by the heat source in order to melt the materials is sufficiently low to require an overall large heat input and, in turn, to produce a large pool size. Laser beams offer the possibility of much higher energy densities and consequently smaller weld pools. Moreover, in laser beam welding the travel speeds attainable are generally much higher than in arc welding. This results in a much more rapid solidification process of the weld zone and might permit the retention of a suitable phase distribution. Unfortunately the most often used mode of laser beam welding is the "Keyhole" mode in which the laser beam forms a cavity around the surface of which molten metal flows, to solidify after the passage of the beam and its cavity. In this mode the disadvantages relative to welding of metal matrix composite components are:

1. The temperatures within the cavity are extremely high so that any material introduced into it will be melted rapidly and flotation and separation could occur in metal matrix composite materials;

2. The cavity temperatures are so high that vaporization loss of volatile elements that are required for matrix strengthening can occur, e.g. Mg in Al-based metal matrix composites; and 3. The cavity is of such a small diameter that feeding of a wire into the cavity is very difficult to control.

An alternative mode of laser beam welding is available. In the "conduction" mode of laser melting the beam power is insufficient to form a cavity and only a small surface layer is heated. Rapid passage of the beam across an area of a metal surface results in a very thin layer of material melting rapidly under the beam action and then solidifying rapidly as the excess heat is conducted away into the body of the material. It has previously been demonstrated that the use of conduction mode welding allows the addition of filler metal additions to laser beam welds. In one method, a special in-line resistance heating conduit is used to direct the filler wire to the weld pool. In this method a line or rectangular shaped beam spot directed onto the weld seam ahead of the wire to provide a thin film of liquid substrate into which the already heated filler wire can be added.

A method of laser beam conduction welding of metallic components using a filler material is described in the aforementioned copending related U.S. Pat. No. 4,737,612, the contents of which are incorporated by reference herein. As described therein, specifically in relation to FIGS. 6 and 7 thereof, a laser beam with a larger waist, and thus lower power density, than that used for keyhole welding, is directed at adjacent portions of one or both of the metallic components to be joined. This produces a conduction weld of molten pool of metal. Heated filler wire is fed into the pool to add filler material to the weld as the components are moved relative to the laser beam. A single pass is made along each edge of the confronting metal components to be joined to produce a finished weld, with a full penetration weld resulting.

It is an object of the present invention to provide a method of laser beam welding of metal matrix composite components that provides a uniform particle or fiber strengthened metal matrix weld joint.

It is another object of the present invention to provide a method of welding metal matrix composite components with full strength joining of the metal matrix composite components.

SUMMARY OF THE INVENTION

Metal matrix composite components are welded together using a laser beam conduction weld with addition of a filler wire of metal matrix composite material.

The metal matrix composite components are abutted together along an intersection where they are to be joined, with a spacing provided between a major portion of the components. A laser beam is directed into the spacing and onto the intersection and oscillated across the intersection to melt portions of both of the components and form a shallow pool of metal matrix composite, while a filler wire of metal matrix composite material is fed to the shallow pool produced. The laser beam and filler wire are moved along the intersection such that the molten pool containing filler wire material is solidified so as to form a weld line without the metal matrix composite separating into phases. A substantially homogeneous metal matrix composite weld is thus formed between the two metal matrix composite components.

The filler wire of metal matrix composite material is preferably heated before being fed to the shallow pool, and the laser beam may be directed at the end of the filler wire in the shallow pool to assist in the flow of filler wire metal matrix composite into the intersection.

In other embodiments, pressure is applied to at least one, and preferably both, of the metal matrix composite components to force the components together during the welding to also assist in the flow of filler wire metal matrix composite into the intersection, or pressure may be applied to the weld line in the direction of the plane of the intersection to produce the weld.

DETAILED DESCRIPTION

Figure 1:
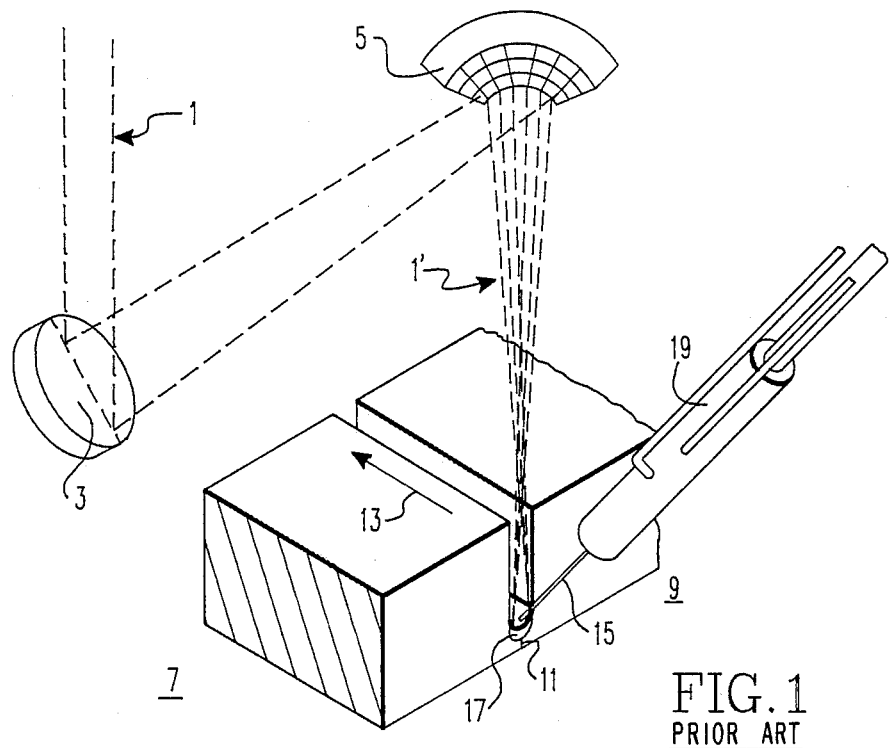
FIG. 1 schematically illustrates a prior art conduction method of welding using a laser where a penetration-type mode of welding is used.

A conduction mode laser beam welding system according to the prior art is illustrated in FIG. 1 where two metallic components are joined. A laser beam 1, from a source not shown is reflected from a flat mirror 3 onto an integrating mirror 5, and from there to the metallic components to be joined, as beam 1'. The two metallic components 7 and 9 are abutted together at an intersection 11 and moved past the laser beam, in the direction of arrow 13. A filler wire 15 is directed into the pool of metal 17, the filler wire preheated by a heating means 19. The line or rectangular shaped laser beam spot 1' is directed onto the weld seam, in a penetration mode, ahead of the filler wire 15 to provide a pool of liquid substrate into which the already heated filler wire 15 is added.

Figure 2:
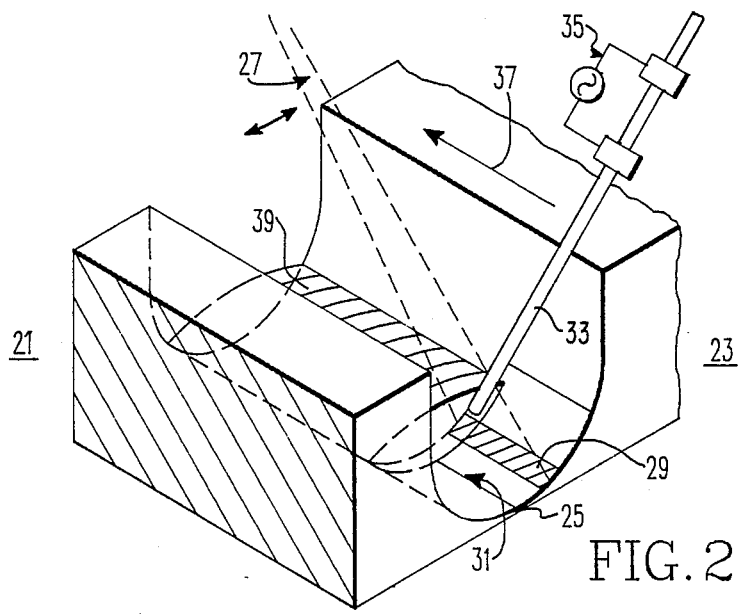
FIG. 2 illustrates schematically an embodiment of the present method for welding of metal matrix composite components using an oscillating laser beam and heated filler wire addition.

An embodiment of the present method is illustrated in FIG. 2. First metal matrix component 21 and second metal matrix component 23 are placed into abutting relationship at intersection 25, where the two metal matrix composite components are to be joined with a major portion thereof spaced apart. A laser beam 27 is directed through the spacing produced onto the two abutting components at the area of the intersection 25 and is oscillated across the intersection, as indicated by the double headed arrow, alternately onto metal matrix composite component 21 and metal matrix composite component 23. An instantaneous laser spot during such oscillation is indicated at 29. The oscillating beam produces a conduction weld with a shallow pool 31 of metal matrix composite of overall low heat content.

A filler wire 33, of the metal matrix composite material, is provided which may be comprised of the metal matrix composite that forms the first metal matrix component 21 and second metal matrix component 23. Or the filler wire may be comprised of a metal matrix composite of a different but compatible composition, for example, when aluminum alloys are welded. Many aluminum alloys, as is known, are welded using filler wires of different compositions because such a procedure produces a better weld than those made using the same composition as the components being welded. The filler wire 33 is preheated such as is illustrated by in-line resistance heater 35 and is fed into the pool 31 of metal matrix composite, while the two metal matrix composite components are moved in the direction of the arrow 37 to produce a weld. The heated metal matrix composite filler wire 33 can be fed into the molten pool 31 to add metal matrix composite filler material to the weld by the preheating device 35 as is described in U.S. Pat. No. 4,447,703, assigned to the assignee of the present invention.

The pool of metal matrix composite formed from the two metal matrix components by the laser beam is a shallow pool, i.e., the volume of the melted metal matrix composite material from the two components is less than the volume of the metal matrix composite added thereto from the melting of the metal matrix composite material of the filler wire.

The term "metal matrix composite" as used herein is used in the general sense to identify a metal alloy containing a relatively uniform dispersion of reinforcing material such as strengthening or stiffening particles or fibers. Especially useful metal alloys for use as the matrix are zirconium, aluminum, magnesium, beryllium, chromium, titanium, cobalt, copper, nickel and iron based alloys. Especially useful reinforcing material in the shape of strengthening or stiffening particles or fibers for dispersion throughout the metal alloy are carbides such as silicon carbide, titanium carbide, beryllium carbide, tantalum carbide, niobium carbide, hafnium carbide, vanadium carbide, zirconium carbide and boron carbide; borides such as titanium boride; nitrids such as silicon nitride; oxides such as beryllium oxide, aluminum oxide and zirconium oxide; and graphite. Generally, the reinforcing material is contained in the metal alloy matrix in an amount of about 5 to 50 volume percent, and preferably in an amount of about 15 to 30 volume percent. An especially useful such metal matrix composite is an aluminum alloy such as Al2024 containing about 20 volume percent of silicon carbide fibers.

The composition of the filler wire, while preferably being the same composite material as the two metal matrix composite components, may in some cases be a different composite material that is compatible with the composite material of the components and sufficient to form a cohesive bond therebetween.

Figure 3:
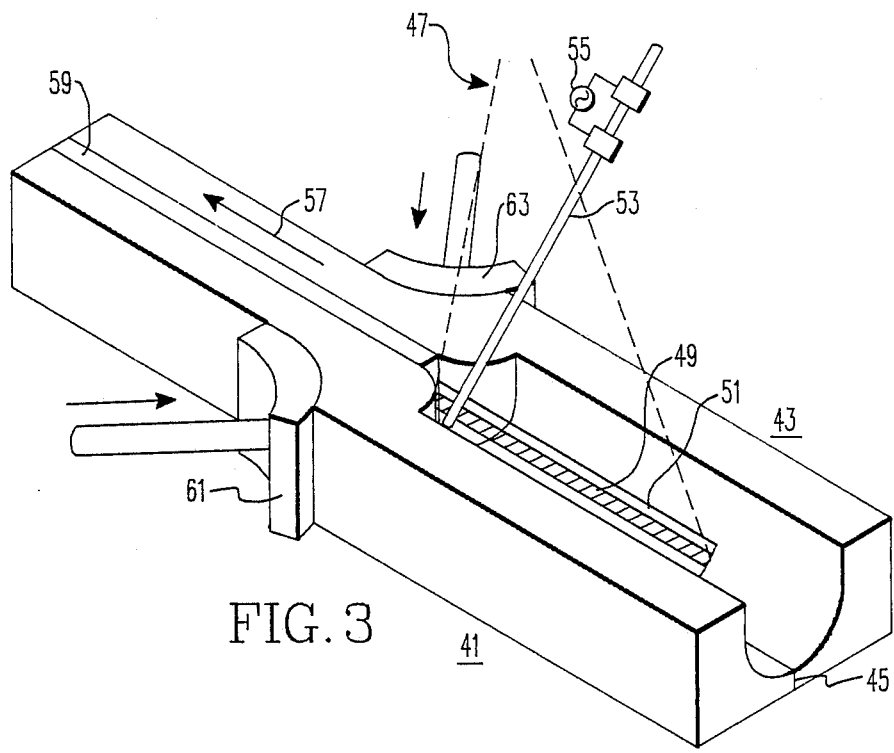
FIG. 3 illustrates schematically an embodiment of the present method where pressure is applied to the metal matrix composite components to force the components together across the intersection therebetween during said welding.
Figure 4:
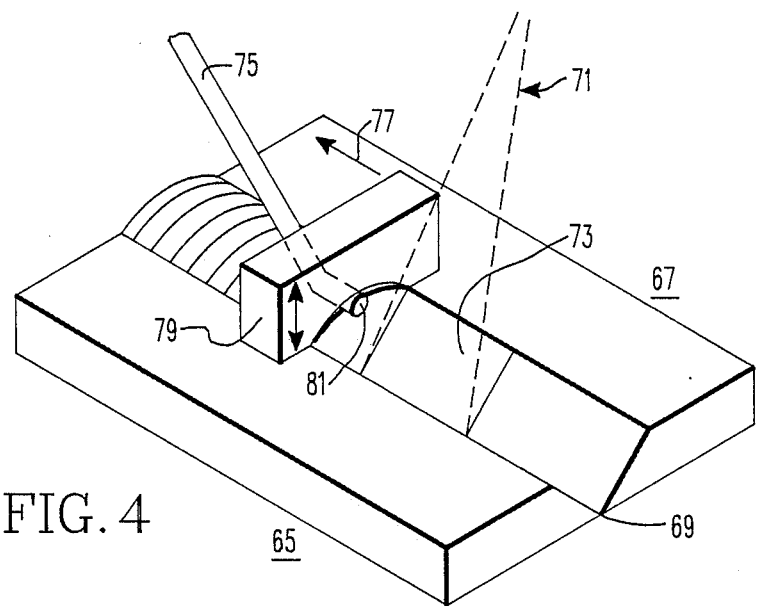
FIG. 4 illustrates schematically an embodiment of the present method where pressure is applied to the weld in the direction of the plane of the intersection to produce the weld.

In the embodiments of the present method illustrated in FIGS. 3 and 4, pressure is applied to assist in the laser beam welding of the two metal matrix components. Referring to FIG. 3, two metal matrix composite components 41 and 43 are abutted together at intersection 45, where the two components are to be joined. A laser beam 47 is directed onto the two abutting components at the area of the intersection and oscillated across the intersection 45. An instantaneous laser spot is indicated at 49. The oscillating beam 47 produces a shallow pool 51 of metal matrix composite, while a filler wire 53 of metal matrix composite material is preheated by heater 55 and fed into the shallow pool, as the two metal matrix composite components are moved in the direction of the arrow 57, to produce a weld 59. Pressure is applied to at least one of the metal matrix composite components, in the direction transverse of the plane of the intersection, to force the components into contact across the intersection 45 so as to ensure flow of filler wire material. In FIG. 3, pressure is shown being applied to both of the metal matrix composite components 41 and 43 across the intersection 45 by opposed pressure application means indicated at 61 and 63.

The embodiment illustrated in FIG. 4 illustrates pressure application being effected downwardly onto the filler addition material. As in the previous embodiments, two metal matrix composite components 65, 67 are abutted along intersection 69. A laser beam 71 is oscillated across the intersection 69 to form a shallow pool 73 of metal matrix composite, while a filler wire of metal matrix composite 75 is fed to the pool 73. The two components 65, 67 are moved in the direction of arrow 77. As the filler addition to the pool is effected, pressure is applied, in the direction of the plane of the intersection, to the filler material, such as by a reciprocable tamper element 79, which reciprocates as indicated by the double arrow in FIG. 4, and may contact the end 81 of the filler wire 75 at the location of the pool 73, so as to produce the weld line 83 without extensive melting of the intersected metal matrix components 65, 67 or the metal matrix filler wire 75.

Successful welds of metal matrix composite components with filler wire composed of metal matrix composite can be made using the present method with beam powers of between 400 watts and 15 kilowatts, with focal elevations of up to about +1.25 to −1.25 inches and speeds of about 5 to 30 inches per minute.

The number of passes necessary using the laser beam heating and filler wire addition to effect a complete weld between two metal matrix composite components will vary depending upon the thickness of the components. In FIG. 4, for example, where relatively thin metal matrix composite components are illustrated, a single pass may be sufficient. In FIG. 2, however, where thicker metal matrix composite components are illustrated, a plurality of passes may be required, with a buildup of molten metal matrix composite component material and filler wire material effected to form a weld between the two metal matrix composite components.

What is claimed is:

1. The method of producing a conduction weld between first and second metal matrix composite components with a metal matrix composite material comprising:
   placing first and second metal matrix composite components into abutting relationship to form an intersection between a portion thereof along which said components are to be joined, with a major portion of said metal matrix composite components spaced from each other;
   directing a laser beam through said spacing in the area of said intersection and oscillating said beam across said intersection and alternately onto each of said spaced portions of said first and second components to produce a conduction weld therebetween with a shallow pool of metal matrix composite;
   feeding a filler wire composed of a metal matrix composite into said pool, such that the volume of the melted matrix composite material from the two components is less than the volume of the metal matrix composite added thereto; and
   moving said laser beam and filler wire along said intersection such that solidification of the molten pool containing said filler wire metal matrix composite is effected to form a weld line without separation of the metal matrix composite into separate phases, so as to produce a substantially homogenous metal matrix composite weld between said first and second metal matrix composite components.

2. The method of producing a conduction weld as defined in claim 1 wherein said filler wire composed of said metal matrix composite is preheated prior to feeding said filler wire into said shallow pool.

3. The method of producing a conduction weld as defined in claim 2 wherein said laser beam is also directed to the end of said filler wire in said shallow pool to assist in the flow of said filler wire metal matrix composite into said intersection.

4. The method of producing a conduction weld as defined in claim 1 wherein pressure is applied to at least one of said metal matrix composite components, in the direction transverse the plane of said intersection, to force said components together across said intersection and to assist in the flow of said filler wire metal matrix composite into said intersection.

5. The method of producing a conduction weld as defined in claim 4 wherein said pressure is applied to both said metal matrix composite components.

6. The method of producing a conduction weld as defined in claim 1 wherein pressure is applied to said weld line, in the direction of the plane of said intersection, onto the pool and filler wire fed thereto to produce said weld without extensive melting of said metal matrix composite of said components and the metal matrix composite of said filler wire.

7. The method of producing a conduction weld as defined in claim 1. wherein said filler wire is composed of the same metal matrix composite material as are the first and second metal matrix composite components.

8. The method of producing a conductive weld as defined in claim 1 wherein said filler wire is composed of a different but compatible metal matrix composite material as are the first and second metal matrix composite compounds.

9. The method of producing a conduction weld between first and second metal matrix composite components with a metal matrix composite material comprising:

placing first and second metal matrix composing components into abutting relationship to form an intersection between a portion thereof along which said components are to be joined, with a major portion of said metal matrix composite components spaced from each other;

directing a laser beam through said spacing in the area of said intersection and oscillating said beam across said intersection and alternately onto each of said spaced portions of said first and second components to produce a conduction weld therebetween with a shallow pool of metal matrix composite;

preheating a filler wire composed of a metal matrix composite;

feeding said preheated filler wire into said pool, such that the volume of the melted matrix composite material from the two components is less than the volume of the metal matrix composite added thereto;

applying pressure to at least one of said metal matrix composite components, in the direction transverse the plane of said intersection, to force said components together across said intersection; and moving said laser beam and filler wire along said intersection such that solidification of the molten pool containing said filler wire metal matrix composite is effected to form a weld line without separation of the metal matrix composite into separate phases, so as to produce a substantially homogenous metal matrix composite weld between said first and second metal matrix composite components.

10. The method of producing a conduction weld as defined in claim 9 wherein said laser beam is also directed to the end of said filler wire in said shallow pool to assist in the flow of said filler wire metal matrix composite into said intersection.

11. The method of producing a conduction weld as defined in claim 9 wherein said pressure is applied to both said metal matrix composite components.

12. The method of producing a conduction weld as defined in claim 9 wherein said filler wire is composed of the same metal matrix composite material as are the first and second metal matrix composite components.

13. The method of producing a conduction weld as defined in claim 9 wherein said filler wire is composed of a different but compatible metal matrix composite material as are the first and second metal matrix composite compounds.

14. The method of producing a conduction weld between first and second metal matrix composite components with a metal matrix composite material comprising:

placing first and second metal matrix composite components into abutting relationship to form an intersection between a portion thereof along which said components are to be joined, with a major portion of said metal matrix composite components spaced from each other;

directing a laser beam through said spacing in the area of said intersection and oscillating said beam across said intersection and alternately onto each of said spaced portions of said first and second components to produce a conduction weld therebetween with a shallow pool of metal matrix composite;

preheating a filler wire composed of a metal matrix composite;

feeding said preheated filer wire into said pool, such that the volume of the melted matrix composite material from the two components is less than the volume of the metal matrix composite added thereto;

applying pressure to said weld line, in the direction of the plane of said intersection, onto the pool and filler wire fed thereto;

moving said laser beam and filler wire along said intersection such that solidification of the molten pool containing said filler wire metal matrix composite is effected to form a weld line without separation of the metal matrix composite into separate phases, so as to produce a substantially homogenous metal matrix composite weld between said first and second metal matrix composite components.

15. The method of producing a conduction weld as defined in claim 14 wherein said laser beam is also directed to the end of said filler wire in said shallow pool to assist in the flow of said filler wire metal matrix composite into said intersection.

16. The method of producing a conduction weld as defined in claim 14 wherein said filler wire is composed of the same metal matrix composite material as are the first and second metal matrix composite components.

17. The method of producing a conductive weld as defined in claim 14 wherein said filler wire is composed of a different but compatible metal matrix composite material as are the first and second metal matrix composite compounds.

* * * * *